United States Patent
Bahr et al.

(10) Patent No.: US 9,254,612 B2
(45) Date of Patent: Feb. 9, 2016

(54) TRANSLATABLE HEAT SHRINK OVEN FOR APPLYING HEAT SHRINK FILM TO A SILICONE RUBBER BLADDER

(71) Applicant: Spirit AeroSystems, Inc., Wichita, KS (US)

(72) Inventors: Rodney Eugene Bahr, Wichita, KS (US); Ryan Craig Harris, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 597 days.

(21) Appl. No.: 13/647,214

(22) Filed: Oct. 8, 2012

(65) Prior Publication Data
US 2013/0086873 A1  Apr. 11, 2013

Related U.S. Application Data

(60) Provisional application No. 61/545,265, filed on Oct. 10, 2011.

(51) Int. Cl.
| | |
|---|---|
| *B29C 65/00* | (2006.01) |
| *B29C 65/66* | (2006.01) |
| *B29C 61/00* | (2006.01) |
| *B29C 63/42* | (2006.01) |
| *B29C 35/02* | (2006.01) |

(52) U.S. Cl.
CPC ........... *B29C 66/73715* (2013.01); *B29C 61/00* (2013.01); *B29C 63/42* (2013.01); *B29C 65/66* (2013.01); *B29C 66/1122* (2013.01); *B29C 66/344* (2013.01); *B29C 66/8181* (2013.01); *B29C 66/836* (2013.01); *B29C 66/8744* (2013.01); *B29C 35/02* (2013.01); *B29C 66/71* (2013.01); *B29C 66/712* (2013.01); *B29C 66/9121* (2013.01); *B29C 66/91421* (2013.01); *B29C 66/932* (2013.01); *B29C 66/934* (2013.01); *B29C 66/939* (2013.01)

(58) Field of Classification Search
CPC ................. B65B 53/00–53/066; B29C 66/00; B29C 66/934; B29C 66/939
USPC .......... 53/442, 557; 156/466, 218, 498, 380.1
See application file for complete search history.

(56) References Cited

U.S. PATENT DOCUMENTS

| | | | | |
|---|---|---|---|---|
| 3,448,847 | A * | 6/1969 | Csimma Sandor | ........... 198/534 |
| 4,054,474 | A * | 10/1977 | Collins et al. | ................... 156/86 |
| 2005/0022469 | A1* | 2/2005 | Fresnel | ........................... 53/399 |
| 2012/0186734 | A1* | 7/2012 | De Isla Puga et al. | ........ 156/218 |

* cited by examiner

*Primary Examiner* — Andrew M Tecco
*Assistant Examiner* — Chelsea Stinson
(74) *Attorney, Agent, or Firm* — Hovey Williams LLP

(57) ABSTRACT

A heat shrink apparatus for heat shrinking a shrink film to a bladder. The heat shrink apparatus may include a support structure, a bladder support system, and a heat chamber. The bladder support system for supporting the bladder thereon may have two spaced apart parallel rows of a plurality of resilient members pivotally and/or resiliently attached to the support structure. The heat chamber may be hollow with opposing end openings and may have one or more heating elements therein. The heat chamber may translate over the shrink film and the bladder along the support structure between the two spaced apart parallel rows, shrinking the shrink film to the bladder. As the heat chamber translates, it may contact ends of the resilient members, thereby pivoting or deflecting the resilient members from a first position to a second position such that the heat chamber can pass between the two parallel rows.

19 Claims, 5 Drawing Sheets

TRANSLATABLE HEAT SHRINK OVEN FOR APPLYING HEAT SHRINK FILM TO A SILICONE RUBBER BLADDER

RELATED APPLICATIONS

This application claims priority benefit of a provisional application entitled, "Heat Shrink Oven to Apply Heat Shrinkable Fluorinated Ethylene Propylene (FEP) Tubing Around a Silicone Rubber Bladder," Ser. No. 61/545,265, filed Oct. 10, 2011 and incorporated by reference herein in its entirety.

BACKGROUND

Silicone bladders are sometimes used in the forming of composite stringers and other hollow composite parts for aircraft. Unfortunately, these bladders can be difficult to remove from within the hollow composite part after the part is cured. To facilitate their removal, peel ply and/or ETFE plastic film is often wrapped onto and taped to the silicone bladders to create a breather between the silicone bladder and the hollow composite part. However, the tape can leave mark-offs or unintended indentions on an inner surface of the hollow composite part. Furthermore, because the peel ply and/or ETFE plastic film is taped by hand, the tightness of the wrap and the locations of the taping may not be uniform for each of the silicone bladders, leading to inconsistency between the hollow composite parts. Additionally, wrapping the bladder in this manner can be time consuming.

A need therefore exists for an improved method and apparatus for applying material to silicone bladders for facilitating their removal from formed composite parts.

SUMMARY

Embodiments of the present invention solve the above-mentioned problems and provide a distinct advance in the art of forming composite aircraft parts. An embodiment of the invention is a heat shrink apparatus for heat shrinking a shrink film to a bladder. The heat shrink apparatus may include a support structure, a bladder support system, a heat chamber, and an actuator. The bladder support system may have two spaced apart parallel rows of a plurality of resilient members. The resilient members in each row may be laterally spaced apart from each other and may be pivotally and/or resiliently attached to the support structure. The parallel rows of the resilient members may cooperatively support the shrink film and bladder thereon. The heat chamber may be hollow with opposing end openings and may have one or more heating elements therein. The heat chamber may translate over the shrink film and the bladder along the support structure between the two spaced apart parallel rows. As the heat chamber translates, it may contact ends of the resilient members, thereby pivoting or deflecting the resilient members from a first position to a second position such that the heat chamber can pass between the two parallel rows. The actuator may translate the heat chamber along a linear path along the support structure down a length of the shrink film and the bladder.

In another embodiment of the invention, the heat shrink apparatus may include a support structure, a bladder support system, a heat chamber, translation elements, and an actuator. The bladder support system may have two spaced apart parallel rows of a plurality of pivotal rigid flappers. The flappers in each row may be laterally spaced apart from each other and may be pivotally and/or resiliently attached to the support structure. The parallel rows of the flappers may be configured for cooperatively supporting the shrink film and bladder thereon. The heat chamber may be hollow with opposing end openings and may have one or more heating elements positioned therein and operable to increase a temperature within the heat chamber. The heat chamber may extend around a portion of the bladder and laterally slide forward and aft over the shrink film and the bladder along the support structure between the two spaced apart parallel rows. During translation, the heat chamber may be positioned to contact ends of the flappers, thereby pivoting the flappers from a first position to a second position such that the heat chamber can pass between the two parallel rows. The translation elements may slidably couple the heat chamber with the support structure. The actuator may translate the heat chamber along a linear path along the support structure on the translation elements down a length of the shrink film and the bladder.

Another embodiment of the invention may include a method for heat shrinking a shrink film to a bladder. The method may include the steps of applying the shrink film, in an expanded configuration, over the bladder and a breather located over the bladder, and placing the shrink film, the breather, and the bladder onto a bladder support system of a heat shrink apparatus. The bladder support system may have two spaced apart parallel rows of a plurality of pivotal rigid flappers. The flappers in each row may be laterally spaced apart from each other and may be pivotally and/or resiliently attached to a support structure. The parallel rows of the flappers may be configured for cooperatively supporting the shrink film and bladder thereon. The method may also include the steps of attaching opposing ends of the shrink film to the heat shrink apparatus in a configuration to apply a tensile load along a length of the shrink film and placing a heated heat chamber around a portion of the shrink film, the breather, and the bladder. Finally, the method may include a step of translating the heat chamber forward and/or aft along a length of the shrink film, the breather, and the bladder. The translating heat chamber may shrink the shrink film to the breather and the bladder and contact ends of the flappers during translation of the heat chamber, thereby pivoting the flappers from a first position to a second position, allowing the heat chamber to pass between the two parallel rows.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
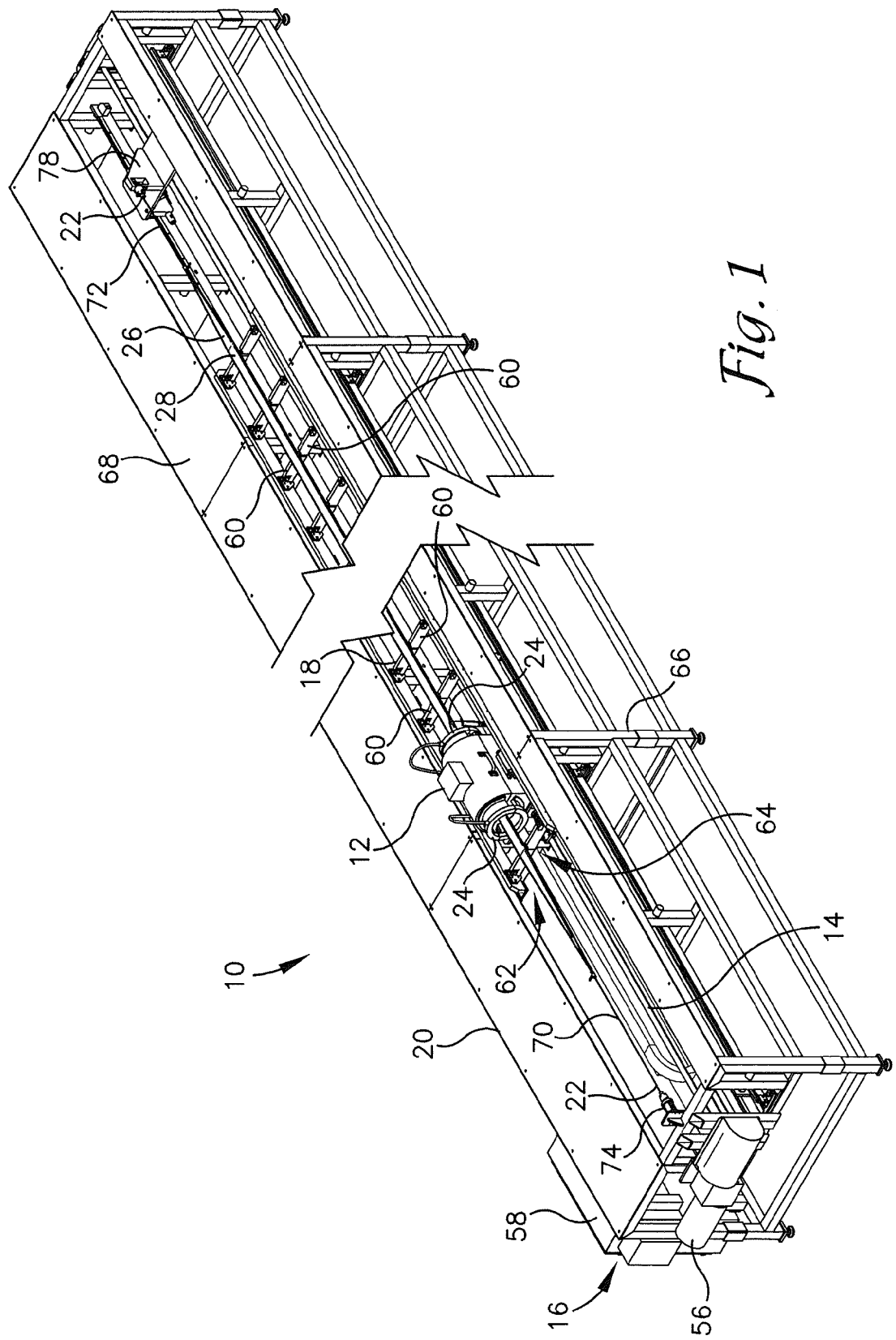
FIG. 1 is a fragmentary perspective view of a heat shrink apparatus constructed in accordance with an embodiment of the present invention.
Figure 2:
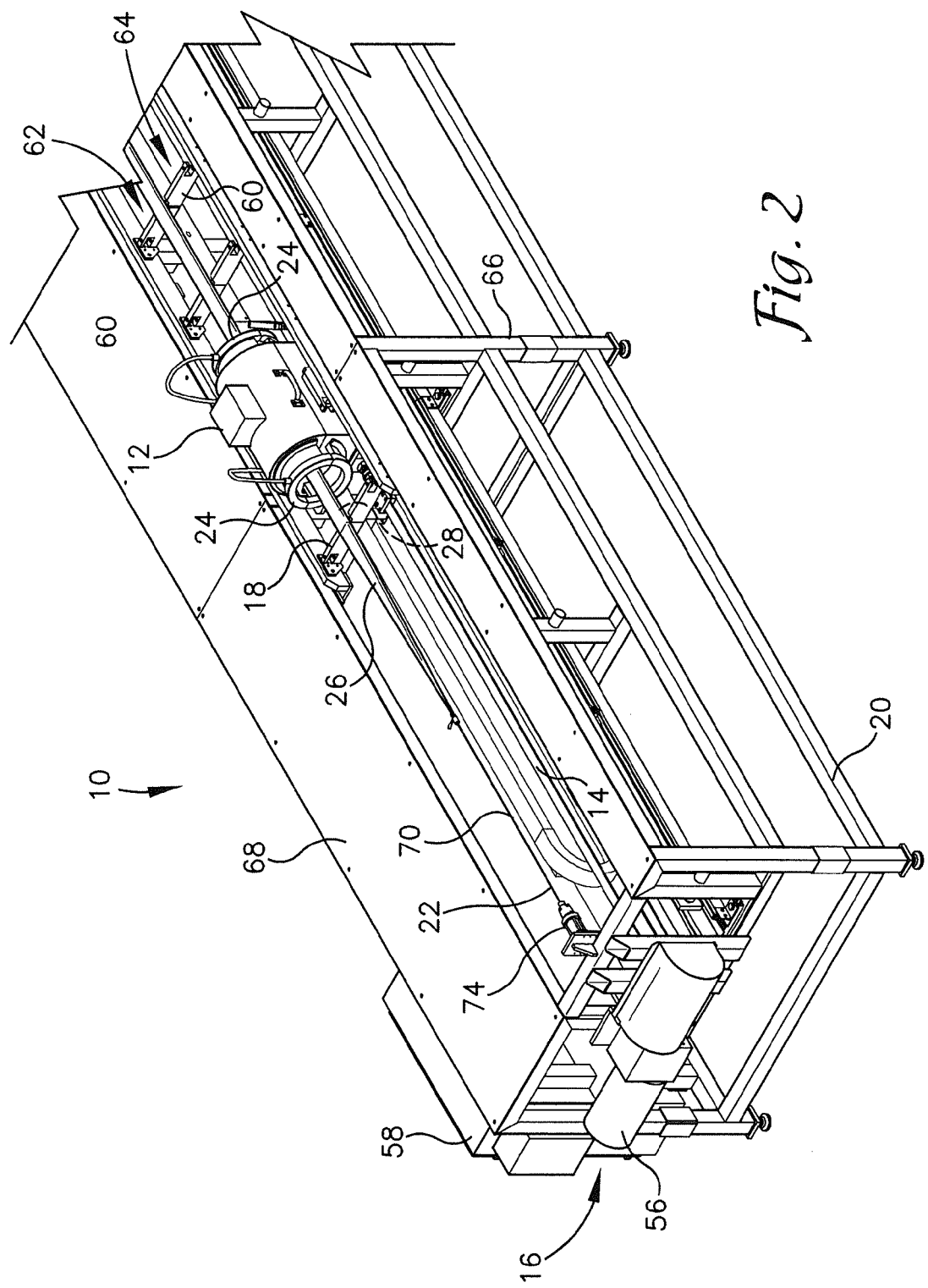
FIG. 2 is a fragmentary perspective view of the heat shrink apparatus of FIG. 1, illustrating a heat chamber and drive system of the heat shrink apparatus.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A heat shrink apparatus 10 constructed in accordance with embodiments of the present invention is illustrated in FIGS. 1-6 and broadly includes a translatable heat chamber 12, translation elements 14, a drive system 16, and a bladder support system 18. The heat shrink apparatus 10 may further comprise a support structure 20, a tensioning system 22, and air knives 24, as further described herein. The heat shrink apparatus 10 may be configured to heat shrink a shrink film 26 around a bladder 28. For example, the shrink film 26 may be a heat-shrinkable fluorinated ethylene propylene (FEP) tubing or any expanded polymeric film material that relies on heat to shrink, such as ETFE (Ethylene, Tetrafluoroethylene), PE (polyethylene), PVF (polyvinyl fluoride), and the like. The bladder 28 may be a silicone rubber bladder or any bladder configured for use in manufacturing hollow composite parts. In some embodiments of the invention, a breather, such as a woven breather sock (not shown), may also be placed over the bladder 28, between the shrink film 26 and the bladder 28.

Figure 3:
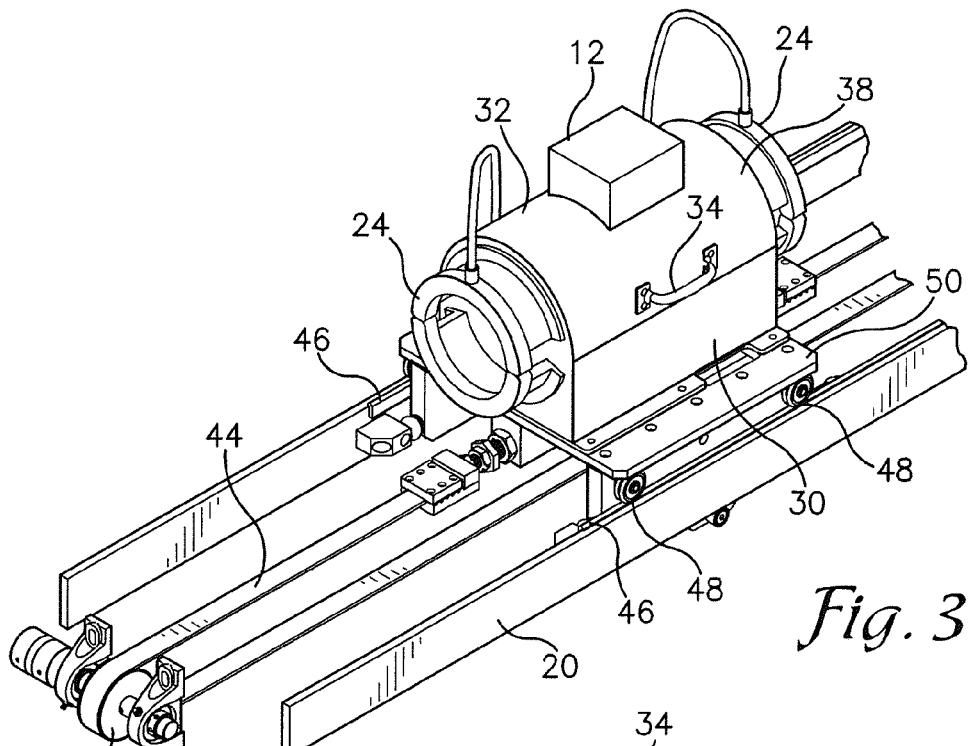
FIG. 3 is a fragmentary perspective view of translation elements of the heat shrink apparatus of FIG. 1, illustrating the heat chamber traveling along the rails of the translation elements.
Figure 4:
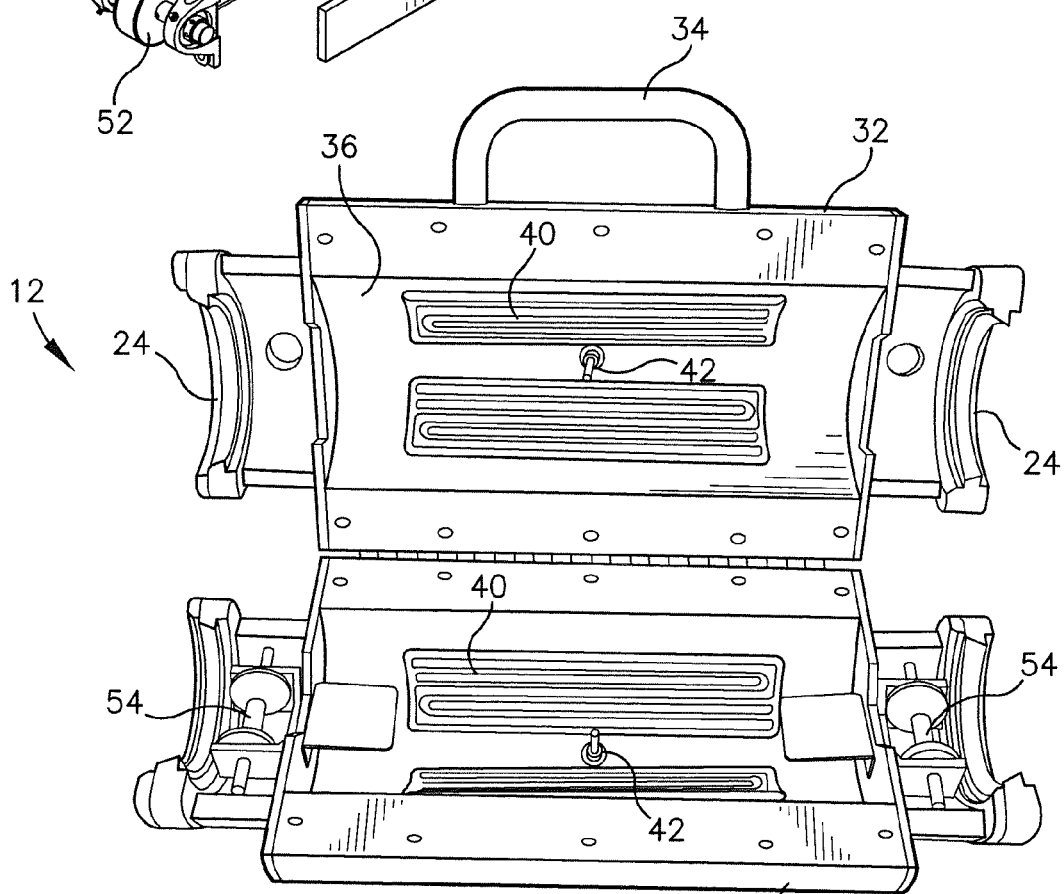
FIG. 4 is a perspective view of the heat chamber of FIG. 2 illustrated in an open position.

The translatable heat chamber 12, best illustrated in FIGS. 3 and 4, may be a 360-degree hollow chamber having openings at opposing ends through which the bladder 28 and/or the shrink film 26 may extend through. The openings may have any shape or configuration required for a given bladder cross-section. For example, if the bladder 28 is in the shape of an aircraft stringer, the openings may have a substantially trapezoidal shape. However, the shape of the openings may be different than the cross-sectional shape of the bladder 28 without departing from the scope of the invention.

In some embodiments of the invention, the heat chamber 12 may comprise a base 30 and a lid 32 configured to be actuated between an open and closed position. For example, the lid 32 may be pivotally attached to the base 30 and may be configured to be latched or otherwise mechanically fixed to the base 30 in the closed position, as illustrated in FIG. 3. The lid 32 is illustrated in the open position in FIG. 4. The lid 32 may have a handle 34 attached to or integrally formed with the lid 32. For example, the handle 34 may be made of corrosion-resistant steel. In an alternative embodiment of the invention, the base 30 and lid 32 may be replaced by a continuous 360-degree hollow chamber that does not open and close, but still has openings formed therein through which the bladder 28 and/or the shrink film 26 may be inserted.

The heat chamber 12 may further comprise an inner wall 36 and an outer wall 38. For example, each of the base 30 and the lid 32 may comprise a portion of the inner wall 36 and a portion of the outer wall 38. The base 30, lid 32, inner wall 36, and/or outer wall 38 may be anodized. The inner and outer walls 36,38 may be made of corrosion resistant steel sheet or any durable material capable of remaining rigid during the shrink heating methods described herein. A hollow space between the inner and outer walls 36,38 may be filled with an insulating material such as ceramic insulation or any substance suitable for restricting heat transfer so that the outer wall 38 is not as hot as the inner wall 36. This may be useful for operator safety. Furthermore, insulation may be added at either end of the heat chamber 12 to prevent substantial heat transfer between the outer wall 38 and the bladder support system 18, as later described herein. For example, ceramic insulation washers may be placed between aluminum end fittings (with the openings formed therethrough) and corrosion resistant steel of the inner and/or outer walls 36,38 of the heat chamber 12.

As illustrated in FIG. 4, one or more heating elements 40 may be situated within the heat chamber 12 and/or attached to the inner wall 36 of the heat chamber 12. The heating elements 40 may, for example produce 2,000 W of heat using four 500 W heating elements or any other combination of heating elements. The heating elements 40 may be configured to produce enough heat to shrink the shrink film 26 against the bladder 28. For example, the heating elements 40 may heat the heating chamber 12 to a temperature between 200° F. and 700° F. However, the amount of heat required for the heating chamber 12 may also depend on a translating speed at which the heat chamber 12 travels, as later described herein. The heat chamber 12 may also comprise one or more sensors 42, such as thermocouples, to sense an inside oven temperature of the heat chamber 12. For example, the heat chamber 12 may comprise a top thermocouple for controlling two top heating elements and a bottom thermocouple for controlling two bottom heating elements, as illustrated in FIG. 4.

As illustrated in FIG. 3, the translation elements 14 may comprise one or more of a conveyor belt 44, tracks 46, wheels 48, and/or ball bearings configured for cooperatively sliding the heat chamber 12 along a length of the bladder 28. For example, the tracks 46 may be attached to the support structure 20 and the wheels 48 may be attached to a platform 50 configured for supporting and/or attaching to the heat chamber 12. In one embodiment of the invention, the heat chamber 12 may rest on the platform 50 and the wheels 48 may include a plurality of V-type wheels. The wheels 48 may be rotatably attached to the platform 50 and may be configured to ride along the tracks 46, which may include two or more parallel, corrosion-resistant V-tracks. For example, two of the V-type wheels may be attached via bolts passing through eccentric bearings to help take up any assembly tolerances of the associated V-track, while another two of the wheels may be attached via bolts passing through concentric bearings. Furthermore, the platform 50 may be attached to the conveyor belt 44, such as a toothed belt driven by an actuator or a drive motor, as later described herein. For example, the conveyor belt 44 may be conveyed by a wheel or spindle 52 rotatably actuated by the drive system 16. In some embodiments of the invention, as illustrated in FIG. 4, freely rotatable spindles 54 may be positioned within the heat chamber 12 and configured to contact and support the shrink film 26 and the bladder 28. The spindles 54 may allow the heat chamber 12 to slide back and forth along the length of the bladder 28 without getting caught on the shrink film 26 and/or the bladder 28. The spindles 54 may be replaced by any freely rotating elements, ball bearings, or other friction-preventing devices for allowing smooth sliding between the base 30 of the heat chamber 12 and the shrink film 26 or bladder 28.

The drive system 16, as illustrated in FIG. 1, may comprise an actuator 56 and a control system 58. The actuator 56 may be a drive motor with a single speed or variable speeds set via the control system 58. In one embodiment of the invention, the actuator 56 may be a drive motor configured to drive the conveyor belt 44, such as a toothed belt attached to the platform 50 that supports the heat chamber 12. The toothed belt may also be tensioned at the platform 50, as illustrated in FIG. 3. For example, a ½ hp, parallel shaft, 90 VDC gearmotor may drive the conveyor belt 44 configured to drive the platform 50 and/or heat chamber 12 along the tracks 46 described above. This exemplary gearmotor may produce 445 in-lbs of torque at 65 rpm and may direct drive a 4-inch diameter toothed gear, which in turn may drive a 2-inch wide toothed belt. Additionally, this exemplary gear motor may allow the heat chamber's linear velocity to be controlled from 0 inches/min up to approximately 650 inches/min. However, note that the power, sizes, and speeds described in this exemplary embodiment of the actuator are merely examples and do not limit the scope of this invention. The actuator 56 may be any electrical, mechanical, and/or hydraulic actuator configured for propelling and/or retracting the heat chamber 12 back and forth along the translation elements 14. Furthermore, the speed at which the heat chamber 12 is a function of the temperature of the heat chamber 12. For example, the higher the temperature of the heat chamber 12, the faster the heat chamber's velocity.

The control system 58 may comprise a user interface which may include switches, knobs, buttons, touch screen, and/or other devices controllable by the user or operator to control the amount of heat, speed, and actuation (via the actuator 58) of the heat chamber 12. For example, the control system 58 may include a multi-channel heater controller configured to process signals from the thermocouples (i.e., sensors 42), comparing these signals to a controller set point to determine whether to turn on or off the heater elements 40 associated with each of the thermocouples. Furthermore, the user interface may be configured to control a speed of the heat chamber 12 and/or the platform 50. For example, the user interface may be used to select a speed of the actuator 56 and/or drive motor. In one embodiment of the invention, the control system 58 may comprise a control box having a master on/off switch, a forward/reverse switch to control the direction of the heat chamber 12, and two switches to control the functionality of the air knife 24. Furthermore, the control system 58 may comprise a motor controller mounted to or near the control box. The motor controller may be configured to start and stop the actuator and adjust a speed of the actuator 56 through a rheostat or any other means known in the art. The speed of the heat chamber 12 may be tracked, sensed, and/or displayed via a digital tachometer. For example, the digital tachometer may display the speed in inches/minute.

In other embodiments of the invention, the control system 58 may comprise any number and combination of controllers, circuits, integrated circuits, programmable logic devices such as programmable logic controllers (PLC) or motion programmable logic controllers (MPLC), computers, processors, microcontrollers, other electrical and computing devices, and/or other data and signal processing devices for automating or otherwise carrying out the functions described herein, and may additionally comprise one or more memory storage devices, transmitters, receivers, and/or communication busses and ports. The control system 58 may be configured for one-way and/or two-way communication with the actuator 56, various feedback sensors of the heat shrink apparatus 10, the translatable heat chamber 12, the air knife 24, and/or any components of the heat shrink apparatus 10. The control system 58 may be configured to communicate with the other components of the heat shrink apparatus 10 via wireless means, such as Wi-Fi or the like, or via wired means, such as via USB cables or the like.

The control system 58 may be configured to implement any combination of the algorithms, subroutines, or code corresponding to method steps and functions described herein. The control system 58 and computer programs described herein are merely examples of computer equipment and programs that may be used to implement the present invention and may be replaced with or supplemented with other controllers and computer programs without departing from the scope of the present invention. While certain features are described as residing in the control system 58 or its memory, the invention is not so limited, and those features may be implemented elsewhere. For example, databases accessed by the control system 58 may be located remotely from the control system 58 and other components of the heat shrink apparatus 10 without departing from the scope of the invention.

In various embodiments of the invention, the control system 58 may implement a computer program and/or code segments to perform some of the functions described herein. The computer program may comprise an ordered listing of executable instructions for implementing logical functions in the control system. The computer program can be embodied in any computer-readable medium for use by or in connection with an instruction execution system, apparatus, or device, and execute the instructions. In the context of this application, a "computer-readable medium" can be any physical means that can contain, store, communicate, propagate, or transport the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), a portable compact disk read-only memory (CDROM), an optical fiber, multi-media card (MMC), reduced-size multi-media card (RS MMC), secure digital (SD) cards such as microSD or miniSD, and a subscriber identity module (SIM) card.

As noted above, the control system 58 may comprise memory storage devices or other various memory elements. The memory may include one or more memory storage devices which may be integral with the control system, stand alone memory, or a combination of both. The memory may include, for example, removable and non removable memory elements such as RAM, ROM, flash, magnetic, optical, USB memory devices, MMC cards, RS MMC cards, SD cards such as microSD or miniSD, SIM cards, and/or other memory elements. Specifically, the memory may store at least a portion of the computer program or code segments described above, as well as user-specified preferences, information regarding user selections, pre-determined heating temperatures for the translatable heat chamber 12, pre-determined speeds of travel for the actuator 56 and/or the heat chamber 12, and the like.

Furthermore, the control system 58 may comprise and/or interface with a user interface such as a mouse, keyboard, touch screen, or various data input ports whereby the user or operator may input data directly into the control system 58 or otherwise exchange information with the control system 58. For example, the control system 58 may be communicably coupled with various means for the user or operator to communicate with and/or program the control system 58, such as a user interface and a graphic display.

The bladder support system 18 may comprise a plurality of repositionable resilient members 60, such as flapper arms configured for supporting the bladder 28 thereon while allowing the heat chamber 12 to pass therebetween. The resilient members 60 may be laterally spaced apart from each other and biased to protrude in a direction toward each other. For example, a first row 62 of spaced-apart resilient members 60 may run substantially parallel to a second row 64 of spaced-apart resilient members 60. The resilient members 60 may be naturally-biased to extend substantially perpendicular to the tracks 46 and corresponding pairs of the resilient members 60 (one from the first row 62 and one from the second row 64) may have ends that face each other and touch, nearly touch, or are spaced a small distance apart from each other in their naturally-biased positions. A distance between ends of these corresponding pairs of resilient members 60 may be less than a maximum width of the heat chamber 12 and at least slightly less than a width of the bladder 28. Specifically, the bladder 28 may be wide enough to rest on portions of the resilient members 60 of both the first and second rows 62,64 simultaneously. The heat chamber 12 may also be positioned such that at least a portion of the heat chamber 12 may engage with the resilient members 60 while translated back and forth along a length of the bladder 28 resting on the resilient members 60. For example, when the heat chamber 12 moves forward and contacts one of the resilient members 60, the contacted resilient members 60 may pivot a first direction (forward) to allow the heat chamber 12 to pass by the contacted resilient members 60. Once the heat chamber 12 is clear of a given pair of resilient members 60, each of the resilient members 60 of that given pair may swing back to their normally-biased position substantially perpendicular to the tracks 46 or a length of the bladder 28. In one embodiment of the invention, the resilient members 60 may be shaped and configured to limit horizontal movement of the bladder 28 in a direction perpendicular with the length of the bladder 28. For example, each of the resilient members 60 may have an indention formed therein matching a size and shape of a portion of the bladder 28 that the resilient member is designed to support thereon.

Note that other configurations of the resilient members 60 may be used, as long as the resilient members 60 are configured to provide support for the bladder 28 while also allowing actuation of each of the resilient members 60 away from the bladder 28 when contacted by the heat chamber 12 during translation thereof along a length of the support structure 20. For example, in an alternative embodiment of the invention (not shown), the resilient members 60 may include a single row of resilient members 60 extending a length of the support structure 20 and configured to flex, deflect, or pivot in a substantially downward direction away from the heat chamber 12 when contacted by the heat chamber 12 during translation thereof.

The quantity of the flapper arms may be dependent on the size of the flapper arms, the amount of support required for the bladder 28, a length of the bladder 28, and a desired amount of length-wise spacing between the flapper arms in each of the first and second rows. In one embodiment of the invention, eighty-four flapper arms are used with forty-two flapper arms in each row. However, any quantity of resilient members 60 may be used without departing from the scope of the invention.

The resilient members 60 may pivot on hinges, such as café-type hinges, or may be made of a material that allows end portions of the resilient members 60 to flex, pivot, or otherwise give to allow passage of the heat chamber 12. The hinges may be spring biased to snap the corresponding resilient members 60 back to a home position substantially perpendicular with the length of the bladder 28 or tracks 46 once the heat chamber 12 is no longer contacting or engaging the resilient members 60. Alternatively, the resilient members 60 may be made of a material that is resilient and flexible in a length-wise direction of the bladder 28 or tracks 46 to allow passage of the heat chamber 12, but thick enough in an up and down direction to rigidly support the bladder 28 thereon.

The support structure 20 may structurally support the bladder support system 18 and/or the translation elements 14. For example, the support structure 20 may comprise a rigid frame 66, a table top 68, and/or a middle shelf. The rigid frame 66 may be made of any rigid material, such as steel, and may structurally support the table top 68 and/or the middle shelf. For example, the rigid frame 66 may be made of welded-together steel tubing. An aluminum table top and middle shelf may provide a working surface and/or a material storage area. However, the support structure 20 may merely include the rigid frame 66 without departing from the scope of the invention. The bladder support system 18 and/or the translation elements 14 may be supported any distance above a floor or ground and provide any required clearance for moving or actuatable components of the heat shrink apparatus 10.

The tensioning system 22 may be any system or apparatus configured to provide tensile load to the shrink film 26. For example, the tensioning system 22 may comprise at least two tensioning cables 70,72 made of corrosion-resistant steel and/or other durable materials. The tensioning cables 70,72 may include an aft tensioning cable 70 and a forward tensioning cable 72 each attached to opposing ends of the shrink film 26. Furthermore, the tensioning system 22 may include a tensioning cable actuator 74 configured for actuating tension in the tensioning cables, thereby tensioning the shrink film 26. However, any method of providing a tensile load to the shrink film 26 to reduce or eliminate wrinkles in the shrink film 26 during heat shrinking thereof may be used without departing from the scope of the invention.

Figure 5:
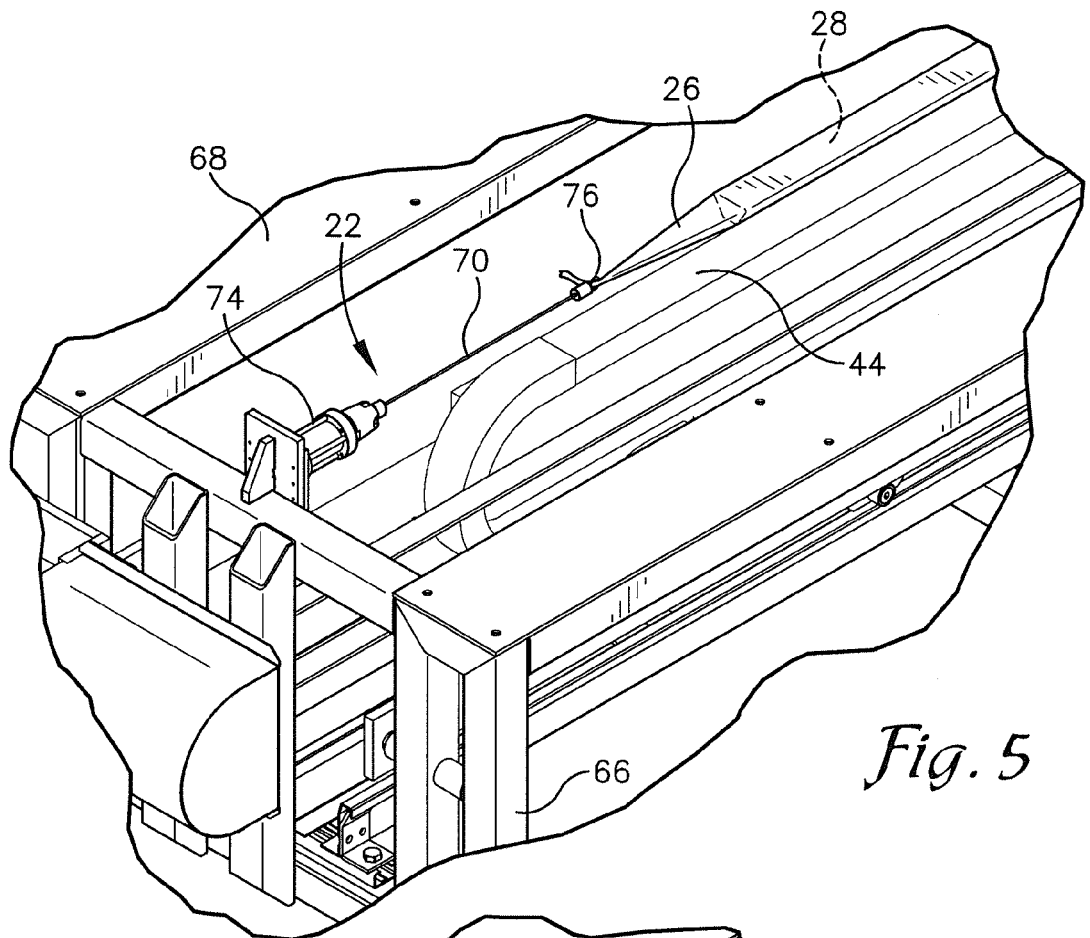
FIG. 5 is a fragmentary perspective view of an aft end of the heat shrink apparatus of FIG. 1, illustrating a tensioning cable actuator of a tensioning system of the heat shrink apparatus.
Figure 6:
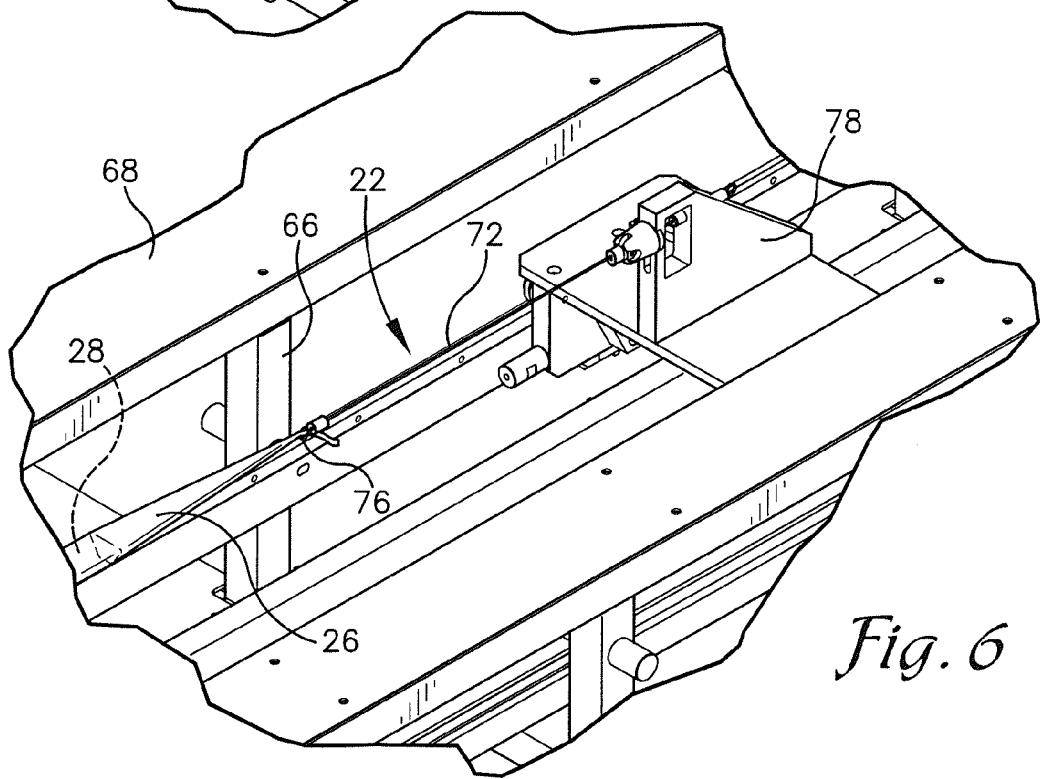
FIG. 6 is a fragmentary perspective view of a forward end of the heat shrink apparatus of FIG. 1, illustrating an adjustable locking anchor.

In some embodiments of the invention, the tensioning cables 70,72 may each be attached to the shrink film 26 at one of the ends thereof via an adjustable noose or wire rope loop 76, as illustrated in FIGS. 5-6. For example, a stationary one of the wire rope loops 76 may be attached at an aft end of the rigid frame 66 and may cinch an aft end of the shrink film 26 to the aft tensioning cable 70. An adjustable one of the wire rope loops 76 on the forward tensioning cable 72 may cinch an opposing forward end of the shrink film 26 and may be attached to an adjustable locking anchor 78. In some embodiments of the invention, the adjustable locking anchor 78 may be repositionable along a length of the support structure 20 and/or the bladder 28 to minimize any shrink film 26 waste by tailoring the working length of the tensioning system 22 to match that of the bladder 28 being processed by the heat shrink apparatus 10.

In some embodiments of the invention, the tensioning cable actuator 74 may comprise a valve, an air cylinder, and an air source. One end of the aft tensioning cable 70 may be attached to a translatable portion of the air cylinder. The lever valve may be a four-way lever valve or any control mechanism for providing automated or operator-control of an amount of air allowed to pass from the air source to the air cylinder, thus controlling forward and aft translation of the air cylinder. The air cylinder may be any pneumatic cylinder used to tighten the shrink film 26 and may be fluidly coupled with and driven by the air source. The air cylinder may be configured to push or pull the aft tensioning cable 70 attached thereto, releasing or adding tension to the aft tensioning cable 70, the shrink film 26, and the forward tensioning cable 72 as required for a given application. Tensioning the shrink film 26 may prevent wrinkles from forming in the shrink film 26 during the heat shrinking process described herein.

The air knife 24 may be SUPER AIR WIPES manufactured by EXAIR Corporation of Cincinnati, Ohio, circular air knives, or other air knives used for blow-off and cooling. Alternatively, the air knives 24 may be replaced with any other blowing and/or cooling device known in the art for facilitating rapid cooling using compressed or forced air. In some embodiments of the invention, a first one of the air knives 24 may be placed at a first end of the heat chamber 12 and a second one of the air knives 24 may be placed at an opposing second end of the heat chamber 12, as illustrated in FIGS. 3 and 4. For example, the first one of the air knives 24 may be configured to blow compressed cooling air away from the heat chamber 12 while the second one of the air knives 24 is configured to blow compressed cooling air into the heat chamber 12. This allows a flow pattern that provides effective cooling within the heat chamber 12.

Activation of the air knives 24 may be initiated and shut off via the control system 58 described above. The air knives 24 may be activated simultaneously or individually and independently via a three-position selector switch or any other user-interface configurations. In one embodiment of the invention, the air knives 24 may be configured to be turned on via activation of an emergency stop switch (not shown). This emergency stop switch may be configured to kill all power to the heat chamber 12, the actuator, and any other heating elements or motors of the heat shrink apparatus 10. Thus, when the emergency stop switch is activated, only the air knife 24 is turned on, while all the other components of the heat shrink apparatus 10 are turned off. This may rapidly cool off the heat chamber due to lack of electrical power and the air provided via the air knife 24. In another embodiment of the invention, the control system may automatically activate the air knives 24 to turn on when motion of the heat chamber 12 is stopped. However, in this embodiment of the invention, the power to all components of the heat shrink apparatus 10 may remain on.

A method of heat shrinking a shrink film to a bladder using the heat shrink apparatus 10 described above may broadly include the steps of applying the shrink film 26, in an expanded configuration, over the bladder 28, placing the shrink film 26 and bladder 28 onto the bladder support system 18, and attaching opposing ends of the shrink film 26 to the heat shrink apparatus 10 in a configuration to apply a tensile load along a length of the shrink film 26. The method may further include the steps of placing the heated heat chamber 12 around a portion of the shrink film 26 and the bladder 28 and translating the heat chamber 12 forward and/or aft along a length of the shrink film 26 and the bladder 28, thereby shrinking the shrink film 26 to the bladder 28. During translation, the heat chamber 12 may consequently contact ends of the resilient members 60 of the bladder support system 18, thereby pivoting the resilient members 60 from a first position to a second position in which the heat chamber 12 can pass between the two parallel rows 62,64 of the resilient members 60.

Figure 7:
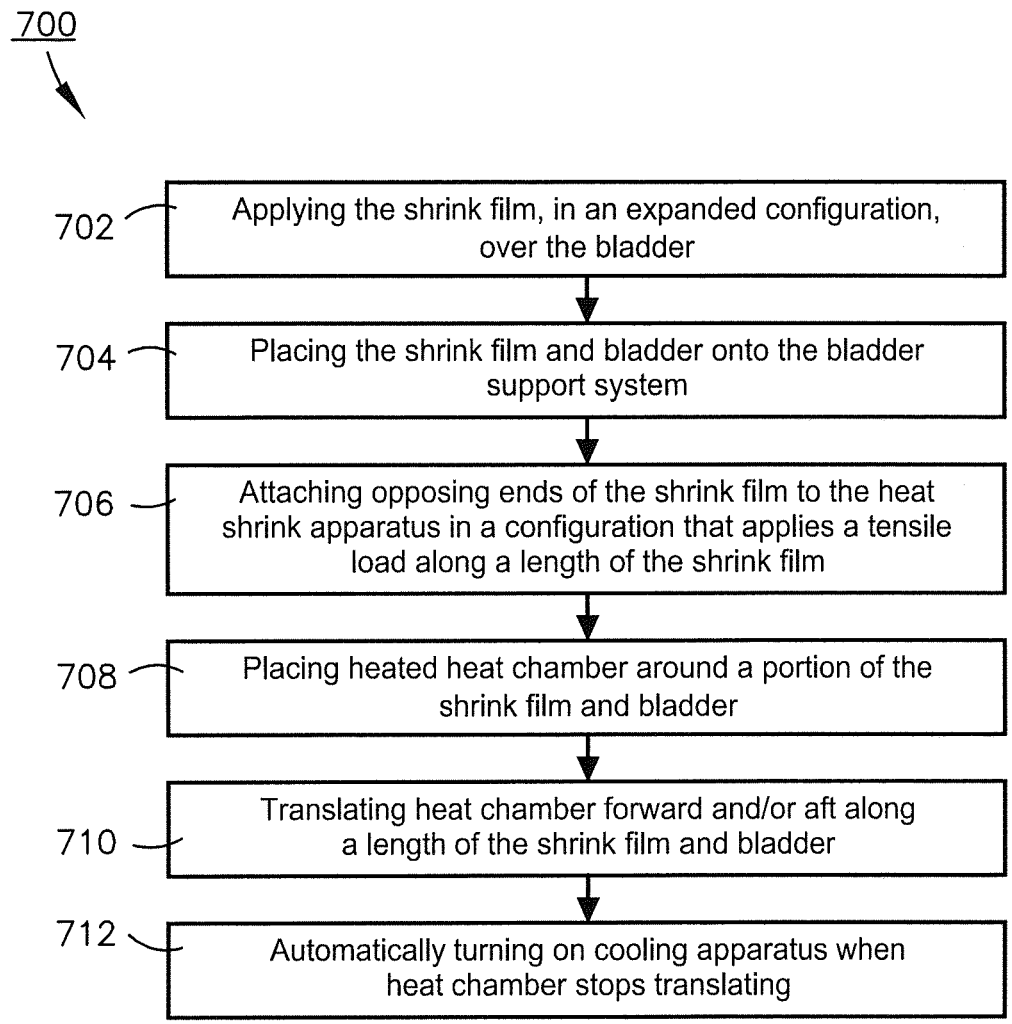
FIG. 7 is a flow chart illustrating a method of heat shrinking a shrink film to a bladder in accordance with an embodiment of the present invention.

The flow chart of FIG. 7 depicts the steps of an exemplary method 700 for heat shrinking a shrink film to a bladder. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved.

As illustrated in FIG. 7 the method 700 may include a step of applying the shrink film 26, in an expanded configuration, over the bladder 28, as depicted in block 702, placing the shrink film 26 and bladder 28 onto the bladder support system 18, as depicted in block 704, and attaching opposing ends of the shrink film 26 to the heat shrink apparatus 10 in a configuration that applies a tensile load along a length of the shrink film 26, as depicted in block 706. Specifically, the heat chamber 12 may be located at a home position and heated to operating temperatures while the bladder 28 is being prepared with the shrink film 26. As noted above, in some embodiments of the invention, the woven breather sock may be placed over the bladder 28 prior to placing the shrink film 26 over both the woven breather sock and the bladder 28. The shrink film 26, in an expanded tubular form, may be slid over the bladder 28 and/or the woven breather sock and the tensioning system 22 may be attached at the opposing ends of the shrink film 26. In the home position, the aft tensioning cable 70 of the tensioning system 22 may pass through the heat chamber 12 and be attached to the aft end of the shrink film 26 residing outward of the heat chamber 12. This home position in which the shrink film 26 and the bladder 28 are not resting within the heat chamber 12 may be useful during an initial heating up of the heat chamber 12, since the heat chamber 12 may melt the shrink film 26 if it dwells over the shrink film 26 for too long. The step 706 of attaching the shrink film 26 to the heat shrink apparatus 10 may specifically include securing the wire rope loops 76 to the shrink film 26, properly positioning the anchor 78 according to a length of the bladder 28, and actuating a desired amount of tension in the shrink film 26 by manual or automatic adjustment of the tensioning cable actuator 74.

The method 700 may further include the steps of placing the heated heat chamber 12 around a portion of the shrink film 26 and the bladder 28, as depicted in block 708, and translating the heat chamber 12 forward and/or aft along a length of the shrink film 26 and the bladder 28, thereby shrinking the shrink film 26 to the bladder 28, as depicted in block 710. The step 708 of placing the heat chamber 12 around the shrink film 26 and the bladder 28 may specifically include pre-heating the heating elements 40 to a desired temperature and then commanding the actuator 56 with the control system 58 to begin actuating the translation elements 14. The heat chamber 12 may be actuated via the drive system 16 to translate over the shrink film 26 and the bladder 28 at a predetermined and/or operator-selected speed, which may depend on the temperature of the heat chamber 12. The speed may be substantially constant, providing even heating and shrinking to the shrink film 26. During translation, the heat chamber 12 may consequently contact ends of the resilient members 60 of the bladder support system 18, thereby pivoting the resilient members 60 from a first position to a second position in which the heat chamber 12 can pass between the two parallel rows 62,64 of the resilient members 60. The method 700 may also comprise a step of automatically turning on the cooling apparatus 24, as depicted in block 712, to blow cool air into the heat chamber 12 when the heat chamber 12 stops laterally sliding forward or aft over the shrink film 26 and the bladder 28.

In some embodiments of the invention, the shrink film 26 may heat-shrink to the bladder 28 in one pass of the heat chamber 12. However, in some embodiments of the invention, a splice may be required between two separate tubes of the expanded shrink film 26. In this situation, the heat chamber 12 may be slowed and/or reversed several times to heat both a top and bottom layer of the splice. For example, an operator may reduce the heat chamber's velocity by 10% when passing over a splice region, then reverse the heat chamber and make a second pass over the splice region. This process may be repeated multiple times. In some embodiments of the invention, four to six passes may be required to adequately shrink both layers in the splice region. Upon completing the splice region, the operator may return the heat chamber's velocity to its original speed and continue actuation of the heat chamber 12 in its original direction down a length of the bladder 28. Alternatively, sensors and or other methods may be used to automatically determine when a splice region is encountered and the control system 58 may automatically slow the velocity of the heat chamber 12 in response to encountering a splice region. Furthermore, the control system 58 may be automated to determine a number of reverses and passes to be made over the splice region by the heat chamber 12 before resuming the original speed and direction of the heat chamber 12 and to command the actuator 56 to perform these operations.

The method and heat shrink apparatus 10 described herein provides a number of advantages over the prior art. For example, the heat chamber 12 moves over a stationary bladder, eliminating the need for an in-feed table and an out-feed table to support a bladder in motion moving through a machine. This, in turn, saves space, because a maximum length of the bladder dictates the length of the heat shrink apparatus 10. The resilient members 60 or flappers described above only support the bladder 28 outward of the heat chamber 12 and are configured to be pushed out the way by the translating motion of the heat chamber 12. This allows the bladder 28 to be unsupported when being processed within the moving heat chamber 12, such that the shrink film may shrink to the bladder 28 without mark-offs left by a conveyor belt or the like. Furthermore, the tensioning system 22 holds the bladder 28 from shifting positions during the shrinking process.

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A heat shrink apparatus for heat shrinking a shrink film to a bladder, the heat shrink apparatus comprising:
    a support structure;
    a hollow heat chamber with opposing end openings, wherein the heat chamber comprises one or more heating elements and is configured to translate over the shrink film and the bladder along the support structure;
    an actuator configured for translating the heat chamber along a linear path along the support structure down a length of the shrink film and the bladder; and a bladder support system having a plurality of resilient members, wherein the resilient members are spaced apart from each other along a length of the support structure and are at least one of pivotally and resiliently attached to the support structure, wherein the resilient members are configured for cooperatively supporting the shrink film and bladder resting thereon.

2. The heat shrink apparatus of claim 1, wherein the heat chamber is configured to contact the resilient members during translation of the heat chamber in such a way as to pivot or deflect the resilient members from a first position to a second position such that the heat chamber can pass by the resilient members while the shrink film and bladder rest on and remain cooperatively supported by the resilient members.

3. The heat shrink apparatus of claim 1, further comprising translation elements slidably connecting the heat chamber with the support structure.

4. The heat shrink apparatus of claim 1, further comprising a control system in communication with at least one of the actuator and the heating elements and configured to control at least one of velocity of the heat chamber and a temperature of the heating elements.

5. The heat shrink apparatus of claim 1, further comprising a cooling apparatus configured to blow cool air into the heat chamber, wherein the cooling apparatus is configured to turn on automatically when the heat chamber stops translating over the shrink film and the bladder.

6. The heat shrink apparatus of claim 5, wherein the cooling apparatus comprises a first air knife at one of the end openings of the heat chamber configured for pulling air out from the heat chamber and a second air knife at another of the end openings of the heat chamber configured for forcing air into the heat chamber.

7. The heat shrink apparatus of claim 1, further comprising a tensioning system configured to attach to opposing ends of the shrink film and to apply a tensile load to the opposing ends of the shrink film.

8. The heat shrink apparatus of claim 4, wherein the shrink film is at least one of a heat-shrinkable fluorinated ethylene propylene (FEP) tubing, ethylene, tetrafluorethylene (ETFE) tubing, polyethylene (PE) tubing, polyvinyl fluoride (PVF) tubing.

9. A heat shrink apparatus for heat shrinking a shrink film to a bladder, the heat shrink apparatus comprising:
    a support structure;
    a bladder support system having two spaced apart parallel rows of a plurality of pivotal rigid flappers, wherein the flappers in each row are laterally spaced apart from each other and at least one of pivotally and resiliently attached to the support structure, wherein the parallel rows of the flappers are configured for cooperatively supporting the shrink film and bladder thereon;
    a hollow heat chamber with opposing end openings, wherein the heat chamber comprises one or more heating elements operable to increase a temperature within the heat chamber, wherein the heat chamber is further configured to extend around a portion of the bladder, laterally slide forward and aft over the shrink film and the bladder along the support structure between the two spaced apart parallel rows, and to contact ends of the flappers during translation of the heat chamber, thereby pivoting the flappers from a first position to a second position such that the heat chamber can pass between the two parallel rows;

translation elements slidably coupling the heat chamber with the support structure; and an actuator configured for translating the heat chamber along a linear path along the support structure on the translation elements down a length of the shrink film and the bladder.

10. The heat shrink apparatus of claim 9, further comprising a control system in communication with at least one of the actuator and the heating elements and configured to control at least one of velocity of the heat chamber and a temperature of the heating elements.

11. The heat shrink apparatus of claim 1, further comprising a cooling apparatus configured to blow cool air into the heat chamber, wherein the cooling apparatus is configured to turn on automatically when the heat chamber stops laterally sliding forward or aft over the shrink film and the bladder.

12. The heat shrink apparatus of claim 11, wherein the cooling apparatus comprises a first air knife at one of the end openings of the heat chamber configured for pulling air out from the heat chamber and a second air knife at another of the end openings of the heat chamber configured for forcing air into the heat chamber.

13. The heat shrink apparatus of claim 9, wherein the flappers are pivotally connected to the support structure by hinges and are each biased in the first position when the heat chamber is not contacting the flappers.

14. The heat shrink apparatus of claim 9, wherein the heat chamber comprises a base and a lid pivotally attached to the base and actuatable between an open position and a closed position.

15. The heat shrink apparatus of claim 9, further comprising a tensioning system configured to attach to opposing ends of the shrink film and to apply a tensile load to the opposing ends of the shrink film.

16. The heat shrink apparatus of claim 10, wherein the shrink film is at least one of a heat-shrinkable fluorinated ethylene propylene (FEP) tubing, ethylene, tetrafluorethylene (ETFE) tubing, polyethylene (PE) tubing, polyvinyl fluoride (PVF) tubing, wherein the velocity and temperature is sufficient to heat shrink the FEP, ETFE, PE, or PVF tubing.

17. A method for heat shrinking a shrink film to a bladder, the method comprising:

applying the shrink film, in an expanded configuration, over the bladder and a breather positioned over the bladder;

placing the shrink film, breather, and bladder onto a bladder support system of a heat shrink apparatus, the bladder support system having two spaced apart parallel rows of a plurality of pivotal rigid flappers, wherein the flappers in each row are laterally spaced apart from each other and at least one of pivotally and resiliently attached to a support structure, wherein the parallel rows of the flappers are configured for cooperatively supporting the shrink film and bladder thereon;

attaching opposing ends of the shrink film to the heat shrink apparatus in a configuration to apply a tensile load along a length of the shrink film;

placing a heated heat chamber around a portion of the shrink film and the bladder; and translating the heat chamber at least one of forward and aft along a length of the shrink film, the breather, and the bladder, shrinking the shrink film to the breather and the bladder and contacting ends of the flappers during translation of the heat chamber, thereby pivoting the flappers from a first position to a second position in which the heat chamber can pass between the two parallel rows.

18. The method of claim 17, further comprising a step of controlling at least one of velocity of the heat chamber and a temperature of the heat chamber with a control system.

19. The method of claim 1, automatically turning on a cooling apparatus configured to blow cool air into the heat chamber when the heat chamber stops laterally sliding forward or aft over the shrink film, the breather, and the bladder.

* * * * *